United States Patent
Doak

[15] 3,636,606
[45] Jan. 25, 1972

[54] METHOD OF FORMING AND INSTALLING AUTOMOBILE TAILPIPE

[72] Inventor: Richard L. Doak, Drawer D, Stroud, Okla. 74079

[22] Filed: July 14, 1969

[21] Appl. No.: 841,350

[52] U.S. Cl. ............................. 29/157.3, 165/51, 264/314
[51] Int. Cl. .................................................... B21d 53/00
[58] Field of Search ............. 165/51, 52, 135, 136; 264/314, 264/137; 29/157.3

[56] References Cited

UNITED STATES PATENTS 2,102,581  12/1937  McNeish ............................... 165/135
2,995,781  8/1961  Sipler .................................... 264/314

Primary Examiner—Charles Sukalo
Attorney—Wood, Herron & Evans

[57] ABSTRACT

A tailpipe formed in situ and a method of forming and installing an automobile tailpipe wherein an inflatable tube is placed within a fiberglass hose, the hose is draped into a proper position within an automobile, the tube is inflated to expand the fiberglass hose, a thermosetting or chemical setting resin or a refractory composition is painted or sprayed onto the fiberglass hose, the coating material is hardened to form a rigid fiberglass tailpipe, and the tube is then deflated and withdrawn.

9 Claims, 11 Drawing Figures

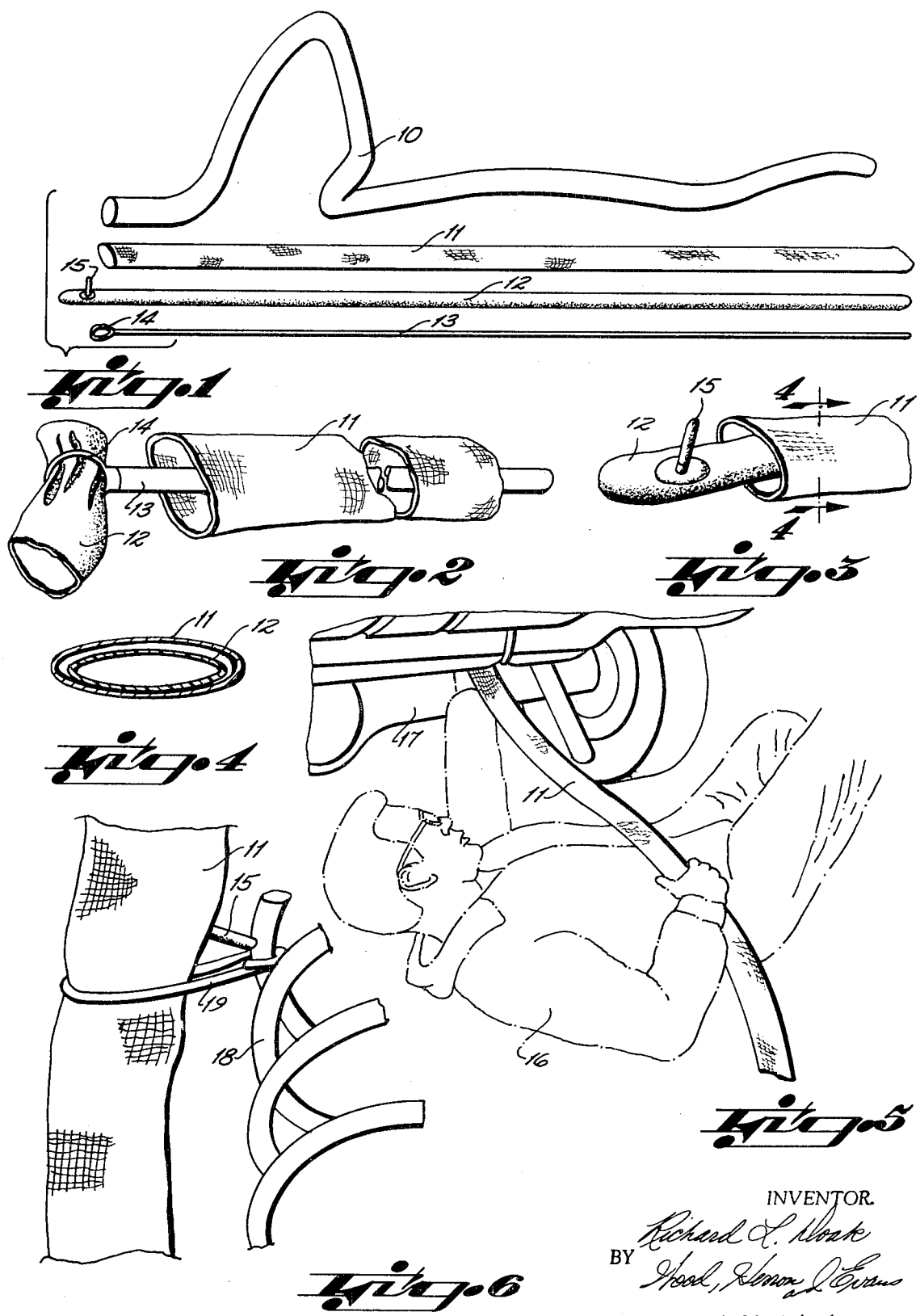

PATENTED JAN 25 1972
3,636,606
SHEET 2 OF 2
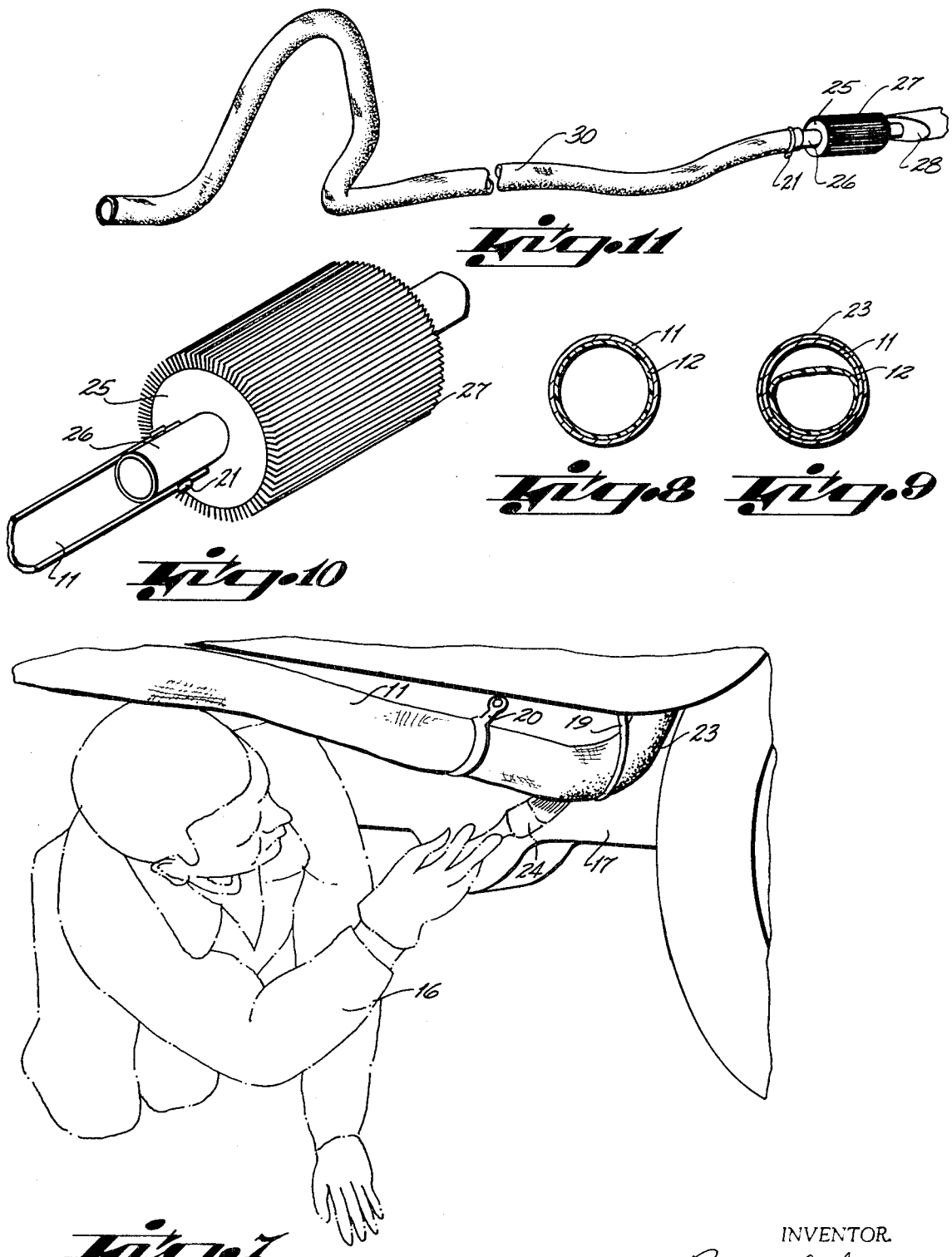
INVENTOR.
Richard L. Noak
BY
Hood, Gerron L. Evans
ATTORNEYS

METHOD OF FORMING AND INSTALLING AUTOMOBILE TAILPIPE

This invention relates to automobile tailpipes, and more particularly the invention is directed to a method of forming automobile tailpipes in place on an automobile.

Automobile tailpipes are tubular members of widely varying shaped. Most automobiles manufactured today require a tailpipe having a configuration unique to that particular make, year and model. Consequently, those businesses engaged in the service of replacing such tailpipes have been required to maintain a large inventory of the many various configurations. To relieve this inventory problem, complicated machinery has been developed to bend tailpipe to order from straight metal tube stock. But both the inventorying of various tailpipe configurations and the machinery to tailor-make these various configurations involve expense beyond that which is practical for all but the large scale tailpipe installers.

An object of the present invention is to provide a method of forming and installing automobile tailpipes which is practical and inexpensive. A further object of this invention is to provide such a method wherein the need to stock various configurations of tailpipe is eliminated and the need for expensive tailpipe forming machinery is avoided.

Another object of this invention is to provide a method of forming and installing automobile tailpipes wherein the tailpipes are formed in position on an automobile. A further object of this invention is to provide such a method wherein a tailpipe is installed in flexible form on an automobile where it is shaped to the contour of the automobile undercarriage and placed into approximate operative position in the automobile exhaust system and subsequently rigidified in place. A more specific object is to provide such a method wherein the hose is installed in a deflated condition and is inflated to a tubular form after installation and prior to rigidification.

The present invention is predicated in part upon the concept of forming tailpipes in position on an automobile as contrasted to forming prior to installation. A tailpipe according to this invention is formed of a flexible hose or tubing which is draped into a position approximately coinciding with a final operative position within an automobile and which is subsequently rigidified.

In the specific embodiment disclosed, an inner tube within the hose is inflated to expand the hose to a tubular shape. The hose is then impregnated with a heat-resistant substance such as a resin or refractory composition which seals the pores of the hose and hardens the hose in its inflated shape.

One of the principal advantages of the present invention is that the need for various shapes of preformed tailpipe is eliminated, thereby eliminating the need for a large inventory of the various tailpipe shapes or the need for machinery to custom form tailpipes. Moreover, the materials and tools required to practice this invention are minimal and can be conveniently and compactly stored.

Another important advantage is that the tailpipe so formed by the method of this invention is highly resistant to corrosion.

A further advantage of this invention is that a tailpipe so formed can follow a more direct path and thus be shorter than can a tailpipe of the preformed type, thus providing economy of material, space, and automobile operation.

These and other objects and advantages of the present invention will be more readily apparent from a consideration of the following detailed description of the drawing illustrating a preferred form of a tailpipe, tailpipe assembly, and a method of forming and installing tailpipe embodying the principles of the present invention.

DESCRIPTION OF THE DRAWINGS

FIG. 1 is an elevational view showing a prior art tailpipe and components employed in practicing the preferred embodiment of this invention;

FIG. 2 is a perspective partial cutaway view showing the use of the components illustrated in FIG. 1 in preparing the hose for installation;

FIG. 3 is a fragmentary perspective view showing the hose ready for installation in an automobile;

FIG. 4 is a cross-sectional view along line 4—4 of FIG. 3;

FIG. 5 is a perspective view showing the installation of a tailpipe according to the principles of this invention;

FIG. 6 is a perspective view showing a portion of the tailpipe tied in position prior to hardening;

FIG. 7 is a perspective view illustrating the steps of application of the heat-resistant coating according to one embodiment of the invention;

FIG. 8 is a cross-sectional view through the tailpipe showing an inflated inner tube;

FIG. 9 is a cross-sectional view of the tailpipe showing the inner tube deflated after hardening of the coating;

FIG. 10 is a perspective view of a cooling fin adapter; and

FIG. 11 is a perspective view showing an automobile exhaust system assembly employing a tailpipe formed according to the principles of this invention.

Referring to FIG. 1, a preformed tailpipe of the prior art is illustrated at 10. Such a tailpipe is usually bent from metal tubing into a specific shape for each make, year and model of automobile. Such a tailpipe 10 is installed in an automobile in a rigid form.

According to the present invention, a tailpipe is formed from a flexible hose 11 which is draped into position within the automobile approximately coinciding with the position of a tailpipe operatively connected into the exhaust system. The hose 11 is then shaped to contour the undercarriage of the automobile. The hose 11 is thereafter rigidified in situ. In the embodiment of the invention illustrated and described in detail below, the flexible hose 11 is draped into place, inflated to a tubular form, and caused to harden by the application of a hardenable coating. The hose 11 is a woven fiber glass hose closely resembling a fire hose in appearance and cut to a desired length from a roll of bulk material.

An inflatable inner tube 12 is inserted into the fiber glass hose 11 with the use of a pull rod 13 by a procedure shown in FIG. 2. The pull rod 13 is first fed through the hose 11. One end of the inner tube 12 is fed through an eyelet 14 at the end of pull rod 13 for removably engaging the tube 12. The rod 13 is then pulled through and out of the hose 11, thus drawing the inner tube 12 axially into the hose 11 providing it with an inflatable inner form or lining.

FIG. 3 shows the inner tube 12 positioned within the hose 11. A valve stem 15 is provided for connection with an airhose from a compressed air source to provide a means for inflating the inner tube 12 and thus expanding the hose 11 to a tubular shape. A cross section of the hose and inner tube assembly prior to inflation is shown in FIG. 4.

FIG. 5 shows the flexible hose 11 being installed in an automobile. The hose 11 is being placed in the approximate position which the tailpipe will attain when operatively connected into the exhaust system. Due to the flexible nature of the hose 11, it is possible to install a tailpipe into an automobile in a more direct path than was previously possible with the prior art tailpipe 10, because the hose 11 can easily be threaded through and around structures on the crowded underside of an automobile. The figure shows the hose 11 being threaded by a mechanic 16 over the rear axle 17 of an automobile.

When the hose 11 is in the desired position, it is contoured to the undercarriage of the automobile and secured in position. It is tied down or clamped at several points along its length to various convenient structures beneath the automobile, such as spring 18. This tying is satisfactorily achieved with short lengths of twine 19 which loosely support the hose 11. Standoff clamps 20 (FIG. 7) are installed to maintain the hose 11 out of contact with the automobile surfaces so that it will not adhere to them upon hardening. The twine 19 is removed after the operation is completed, and permanent clamps are installed.

The hose 11 is also connected to the adjoining sections of pipe of the exhaust with a conventional stainless steel hose clamp 21 shown in FIGS. 10 and 11 to form a substantially air-tight connection. Before the hose 11 is so attached, the end of the hose can be saturated with resin and clamped into position on the adjoining pipe section to form a tight seal.

When the hose 11 has been secured in place, it is then inflated to the shape shown in FIG. 8. This inflation is achieved by injecting air into the inner tube 12 through valve stem 15. The inflated hose 11 is further contoured if necessary.

FIG. 7 shows the application of a coating 23 to the surface of the inflated hose 11. The coating 23 seals the pores of the hose 11 and hardens, causing the hose to rigidify. The coating material is a thermosetting or chemical setting resin or a refractory composition of the type described in U.S. Pat. No. 2,076,898 which can be applied with a brush 24 or can be sprayed on the hose. The coating material 23, to be suitable for this purpose, should have good heat-resisting qualities. There are many resins and other hardenable materials on the market today that would make suitable coating materials for this purpose, and better materials are constantly being developed. The material should be selected from those commercially available at the time which exhibit the best combination of the properties of heat resistance, hardened state rigidity and durability, and ease of application.

An epoxy resin when used for this purpose is premixed with a hardening agent prior to its application. Such mixtures may typically set in 1 to 2 hours after mixing at room temperature. The resin should, however, remain liquid for a sufficient amount of time to allow completion of the operation but should set as soon thereafter as possible so that the automobile can be returned to operation.

When the coating 23 has hardened, the hose 11 will remain of circular cross section hardened by the coating 23. The cross section of the tailpipe subsequent to deflation of the hose 12 is shown in FIG. 9.

While the selection of hose and coating materials is determined partially by their heat-resistant properties, it is important to note that the temperatures of the exhaust gases will be hotter nearer to the motor. The gases in the section of tailpipe between the exhaust manifold of the motor and the muffler will be hotter than the gases in the section of tailpipe behind the muffler. Thus, more materials would be acceptable for the latter section. The temperature requirements for the materials can be relaxed by installation of a cooling fin adapter ahead of the tailpipe section either upstream of the muffler, downstream of the muffler, or both. Such an adapter 25 is shown in FIG. 10. This adapter includes basically a straight through tube 26 and the plurality of cooling fins 27 integrally formed with the tube 26. The fins 27 will dissipate heat and thereby cool the gases passing through the tube 26. The fins 27 may be longitudinally or radially arranged.

A system employing the cooling fin adapter 25 is shown in FIG. 11. A muffler 28 is connected in fluid tight engagement with one end of the cooling fin adapter 25. The other end of the cooling fin adapter 25 is then connected in fluidtight engagement with a finished tailpipe 30. The flow of the exhaust gases is indicated by the arrow 29 in FIG. 11.

As an alternative to the specific embodiment disclosed above, the present invention contemplates an embodiment wherein the inner tube 12 is constructed of a throwaway material which may be left within the finished tailpipe 30 and will disintegrate upon exposure to the exhaust gases of the automobile.

Further alternative embodiments contemplated by the present invention include such features as: the inner tube 12 being integral with the hose 11 and which may further form a permanent smooth lining for the finished tailpipe 30; the coating 23 being presoaked into the hose 11 prior to the insertion in the automobile, which may be done immediately before installation so that the hardening substance 23 will rigidify the tubing in place after it has been installed and inflated; and the hose 11 being presoaked with the coating 23 or itself made of a hardenable substance which can, after insertion and inflation, be caused to harden by application of heat, by a chemical hardener in possibly a vapor or spray form, by radiation, or by other means.

Other embodiments and improvements of the type described are within the broad scope of this invention.

What is claimed is:

1. A method of forming and installing a tailpipe in automobile comprising the steps of:
    placing a flexible hose of heat-resistant and corrosion-resistant material into approximate operative position in the exhaust system of an automobile;
    shaping the hose to the contour of the undercarriage of the automobile while said hose is in said position within said exhaust system;
    maintaining said hose in an expanded form without externally and rigidly constraining the radial expansion of said hose along the length of said shaped position; and
    subsequently rigidifying the hose.

2. A method of forming and installing a tailpipe in an automobile as set forth in claim 1 further comprising the step of:
    expanding the hose to a tubular form prior to rigidification of the hose.

3. A method of forming and installing a tailpipe in an automobile as set forth in claim 1 further comprising the steps of:
    inserting an inflatable inner tube into the hose; and
    then inflating the inner tube to expand the hose to a tubular form prior to rigidification of the hose.

4. A method of forming and installing a tailpipe in an automobile as set forth in claim 3 further comprising the steps of:
    deflating the inner tube subsequent to rigidification of the hose; and
    then withdrawing the deflated inner tube from the rigidified hose.

5. A method of forming and installing a tailpipe in an automobile as set forth in claim 1 further comprising the steps of:
    coating the hose with a hardenable material; and
    then hardening the hardenable material to cause the rigidification of the hose.

6. A method of forming and installing a tailpipe in an automobile as set forth in claim 5 wherein:
    the hardenable material is a thermosetting resin.

7. A method of forming and installing a tailpipe in an automobile comprising the steps of:
    inserting an inflatable inner tube into a precut length of flexible hose of heat-resistant and corrosion-resistant material;
    placing the hose containing the inner tube into approximate operative position in the exhaust system of an automobile;
    shaping the placed hose to the contour of the undercarriage of the automobile while said hose is in said position within said exhaust system;
    inflating the inner tube to expand the shaped hose to a tubular form without externally and rigidly constraining the radial expansion of said hose along the length of said shaped position;
    coating the expanded hose with hardenable material;
    hardening the hardenable material to rigidify the coated hose;
    deflating the inner tube; and
    withdrawing the deflated inner tube from the rigidified hose.

8. A method of forming and installing a tailpipe in an automobile as set forth in claim 7 wherein:
    the hardenable material is a thermosetting resin.

9. A method of forming and installing a tailpipe in an automobile as set forth in claim 3 wherein:
    the inflatable inner tube is composed of a disintegrable material.

* * * * *